United States Patent
Woolford et al.

(10) Patent No.: US 7,131,393 B2
(45) Date of Patent: Nov. 7, 2006

(54) SELECTION SYSTEM AND METHOD FOR MILKING ANIMALS

(75) Inventors: Murray Winston Woolford, Hamilton (NZ); Jennifer Jago, Hamilton (NZ); Peter James Albert Copeman, Hamilton (NZ); Kevin Phillip Bright, Hamilton (NZ)

(73) Assignee: Greenfield AMS Limited, Hamilton (NZ)

( * ) Notice: Subject to any disclaimer, the term of this patent is extended or adjusted under 35 U.S.C. 154(b) by 29 days.

(21) Appl. No.: 10/482,069

(22) PCT Filed: Jun. 21, 2002

(86) PCT No.: PCT/NZ02/00115

§ 371 (c)(1),
(2), (4) Date: Jun. 28, 2004

(87) PCT Pub. No.: WO03/000044

PCT Pub. Date: Jan. 3, 2003

(65) Prior Publication Data

US 2004/0244696 A1 Dec. 9, 2004

(30) Foreign Application Priority Data

Jun. 21, 2001 (NZ) .................................. 51521

(51) Int. Cl.
*A01K 1/12* (2006.01)
(52) U.S. Cl. ................................. 119/14.03; 119/14.18
(58) Field of Classification Search ............ 119/14.03, 119/14.02, 14.18, 840, 841, 842, 843, 51.02
See application file for complete search history.

(56) References Cited

U.S. PATENT DOCUMENTS

| 3,246,631 | A |   | 4/1966  | Holm |
|-----------|---|---|---------|------|
| 3,952,705 | A | * | 4/1976  | Witmer et al. ............ 119/51.03 |
| 4,565,160 | A | * | 1/1986  | Cook .......................... 119/665 |
| 4,617,876 | A | * | 10/1986 | Hayes ......................... 119/842 |
| 4,917,048 | A | * | 4/1990  | Beattie et al. ............... 119/502 |
| 5,205,063 | A | * | 4/1993  | Sutherst et al. ............... 43/107 |

(Continued)

FOREIGN PATENT DOCUMENTS

EP          0 582 350 A2    2/1994

(Continued)

*Primary Examiner*—Yvonne R. Abbott
(74) *Attorney, Agent, or Firm*—Blakely, Sokoloff, Taylor & Zafman; Stephen M. De Klerk

(57) ABSTRACT

A selection system for animals comprising: (a) a milking area (20) arranged to enable milking of one or more lactating animals (b) a drinking station (30) remote from the milking area (20) in which is positioned an attractant configured to attract an animal from a grazing paddock (50) (c) an entry race (70) connecting the drinking station (30) and the milking area (20) (d) a control mechanism (60) configured to permit entry of a lactating animal meeting a predefined criterion into the entry race (70) from the drinking station (30). Also a method utilising the above system and comprising: (a) attracting an animal from a grazing paddock (50) into the drinking station (30) remote from the milking area (20) (b) determining whether the animal in the drinking station (30) meets a predefined criterion (c) permitting entry of the animal meeting the predefined criterion into the entry race (70).

22 Claims, 4 Drawing Sheets

U.S. PATENT DOCUMENTS

| | | | |
|---|---|---|---|
| 5,755,177 A * | 5/1998 | Michehl | 119/51.03 |
| 5,782,199 A * | 7/1998 | Oosterling | 119/14.02 |
| 6,019,061 A * | 2/2000 | Schulte | 119/14.03 |
| 6,062,164 A * | 5/2000 | Oosterling | 119/14.02 |
| 6,263,832 B1 * | 7/2001 | van den Berg | 119/14.08 |
| 6,571,730 B1 * | 6/2003 | Norberg | 119/14.03 |
| 6,622,651 B1 * | 9/2003 | Dessing | 119/14.08 |
| 6,837,189 B1 * | 1/2005 | Schick | 119/840 |

FOREIGN PATENT DOCUMENTS

| | | |
|---|---|---|
| EP | 0 801 894 A2 | 10/1997 |

\* cited by examiner

SELECTION SYSTEM AND METHOD FOR MILKING ANIMALS

CROSS-REFERENCE TO OTHER APPLICATIONS

This Application is a National Phase of International Application No. PCT/NZ02/00115, filed on Jun. 21, 2002, which claims priority from New Zealand Patent Application No. 512521, filed on Jun. 21, 2001.

This invention relates to a system for the automatic selection of animals for milking.

This invention has been developed primarily for use in the remote automatic pre-selection of bovine cows for milking and for managing their movement around extensive grazing areas and will be described hereinafter with reference to this application. However, it will be appreciated that this invention is not limited to this particular field of use, and could be applied to any lactating animal.

BACKGROUND OF THE INVENTION

Automatic milking systems (AMS) are well known in the art. The current implementations of AMS are almost entirely with housed cows. Cows are bedded and fed in a large barn that also houses the AMS. Cows learn to circulate freely the short distance between their cubicles and the AMS unit, a prime motivator being in-bail feeding while they are being milked in the AMS. The cows only need to move comparatively short distances, perhaps 20–30 m within the housing system to the AMS.

Many cows around the world are not housed in this fashion, however, but freely graze pasture. In New Zealand and Australia, in particular, there is no housing of cows, they spend all their time on pasture. These pasture-based systems are very extensive and often require the cows to walk considerable distances to be milked in conventional milking systems. This can be up to 2–3 km walking distance, and they normally do this twice a day.

Usually such extensive pasture systems also require a systematic rotation around paddocks, typically one paddock per day, to most effectively utilise the feed that is grown.

Implementation of AMS under extensive pasture systems is a challenge and has not previously been achieved in the context of a pasture based system. Limited combination of AMS with grazing has been implemented in Europe usually with housing of the cows.

The cows are normally housed, but are let out for a limited period to adjacent paddocks.

In such cases pasture typically contributes less than 30% of the total diet. In New Zealand, and many Australian scenarios, pasture will contribute more than 80% of the total dietary intake over the lactation.

More remote paddocks have been used in some systems (ie up to 400 m) and milking has been achieved by using the motivator of shifting the drinking water to the other side of the AMS. Where the principal feed is pasture, this may not be an acceptable strategy, particularly from an animal ethics viewpoint. It may also require cows to walk considerably distances to access water, depending on how frequently they require to drink.

U.S. Pat. No. 4,508,058 discloses a milking system for use where cows are allowed to find their own way toward a stall, known as "going loose". The system includes a computer that identifies a transponder tagged cow when it enters a robotic milking stall. If the computer determines feeding is required then the cow is fed. If the computer determines milking is required, the cow is retained and milked. If neither of these criteria are met, the cow is released. The cows are tempted into the stalls by the promise of food.

The context of "go loose" as used in U.S. Pat. No. 4,508,058 is certainly not that of trafficking to remote pasture sites.

U.S. Pat. No. 5,771,837 describes a milking parlour where cows are free to wander around a feeding trough that runs almost to each end of the parlour. At one end the cows can pass around the trough. At the other end the cows must enter a selection compartment and are tempted to do so by a fodder concentrate. In the selection compartment a cow is identified by its transponder and if it meets one of the criteria for milking such as lactation it is released into the milking stall. If it does not meet the criteria it is allowed to pass through a separate gate leading to the other side of the feeding trough whereby it begins a circuit of the parlour again. Once milking of a selected cow is complete it is released at the same place. The fact that another circuit of the parlour is required before a cow can re-enter the selection compartment aims to prevent cows that are not eligible for milking from re-entering it. This system does not attempt to reduce total walking distance.

This does not envisage remote, far-field pre-selection of cows on the basis of normal behaviours such as drinking, for direction to the AMS or subsequent transfer to a new area of pasture, and minimisation of walking distance which can be extensive in remote pasture feeding.

U.S. Pat. No. 6,062,164 teaches of a "lying and walking" area connected by a first polling gate to a waiting area and a feeding and watering area. Cows entering the gate are identified and directed towards the former area if milking is required and towards the latter if it is not.

Once in the feeding and watering area the cow can only return to the lying and walking area. Once in the waiting area the cow can pass into a lane leading to one or more milking stalls. Upon leaving the stall a cow enters a second polling gate and may be directed to a segregation area if, for example, mastitis is detected, directed to the feeding and watering area if milking was successful, or directed back to the waiting area for reentry into a milking stall if milking was unsuccessful. Also disclosed is the fact that it has been found in practice that it is necessary to coerce animals to enter the first polling gate, such as by using moveable electric fences.

U.S. Pat. No. 6,148,766 discloses identification of an animal by a computer system which opens the doors of a milking stall if the animal is to be milked and luring the animal into the stall using food and is of general relevance only.

None of these implementations of AMS with grazing have been on the scale that is required in a pasture based dairying system nor have any suggested a practical means for implementing AMS on an extensive pasture based grazing system.

It is desirable that any AMS system is designed to facilitate a cow's adaption to it. In any multiple paddock system it would be desirable that the system has a high degree of symmetry. This way a cow can be familiar with the layout no matter what paddock she is in.

An automated system is required for pasture grazing cows that can determine if such cows are due to be milked so that AMS technology can be successfully applied to pasture grazing cows. Any such system of the prior art requires a cow to walk to the AMS before it is selected, which is not feasible for pasture based dairying systems. Special systems are required to make AMS functional under these conditions.

It is an object of the present invention to overcome or ameliorate at least one of the disadvantages of the prior art, or at least to provide a useful alternative.

SUMMARY OF THE INVENTION

In broad terms in one form the invention comprises. a selection system for animals comprising:

a milking area arranged to enable milking of one or more lactating animals; an attractant station located in a grazing area in a position external to, and remote from the milking area, said attractant station including an attractant configured to attract an animal from the grazing area; an entry race connecting the attractant station and the milking area; and a control mechanism configured to permit entry of a lactating animal meeting a predefined criterion into the entry race from the attractant station.

In broad terms in another form the invention comprises. a method of selecting animals for milking in a milking area comprising the steps of:

attracting an animal from a grazing area into an attractant station located in the grazing area in a position external to, and remote from the milking area, an entry race connecting the attractant station and the milking area; determining whether an animal in the attractant station meets a predefined criterion; and permitting entry of the animal meeting the predefined criterion into the entry race.

BRIEF DESCRIPTION OF THE FIGURES

A preferred embodiment of the present invention will now be described, by way of example only, with reference to the accompanying drawings in which.

DETAILED DESCRIPTION OF PREFERRED FORMS

Figure 1:
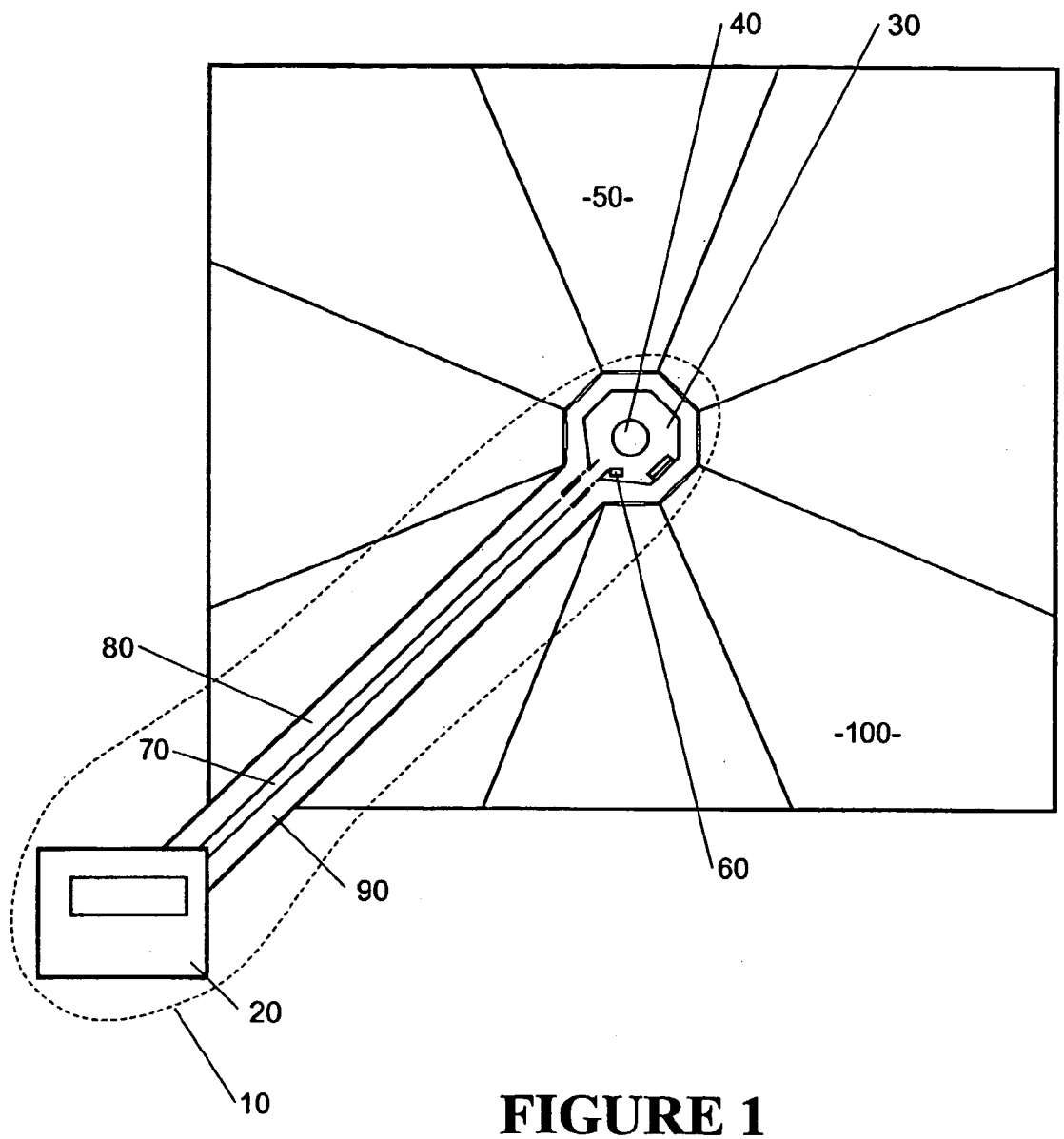
FIG. 1 is an illustration of how the selection system of the invention can be used in extensive grazing husbandry.

Referring to the drawings, a selection system for milking animals is described which could enable an automatic milking system (AMS) to be efficiently used in extensive grazing husbandry. Lactating animals, for example cows, are attracted to an attractant station from a grazing area. As cows come to drink at the attractant station, they are identified and checked against milking records. If a cow meets a predefined criterion, it is directed to a milking area which could include an automatic milking system. If a cow does not meet a predetermined criterion, the cow is directed back to the grazing area from where it came.

FIG. 1 shows one preferred form of the selection system 10. The selection system includes a milking area 20. This milking area could comprise a series of conventional stalls and milking apparatus or could alternatively or additionally include an automatic milking system (AMS). The system also includes an attractant station 30. The attractant station 30 is positioned remote from the milking area 20. Remote in this context includes a distance of at least 50 meters. In one form the distance could be in the range of approximately 250 meters to 450 meters.

An attractant is positioned in the attractant station 30. In one form, this attractant could include a water trough 40. Lactating cows are known to drink at least once in a 24 hour period in a pasture-based system. The system 10 makes use of an animal's basic physiological drive to drink water in order to attract an animal to the drinking area 40.

The attractant could alternatively or additionally could include molasses, a salt lick, or a feed concentrate. The attractant is preferably a feed or water substance that upon normal feeding patterns, a lactating animal will only feed from a few times per day. Prior art systems attract animals using normal feed, such as hay or grain, which upon normal feeding patterns will attract an annual up to six times per day.

The present system seeks to increase the number of cows able to be milked by a milking area by milking each cow less than twice a day, perhaps 1. 3 times per day, and in so doing reducing capital investment on a per-cow basis. The system differs from traditional European systems in that the cow is attracted by a substance which it requires a few times per day rather than a normal feed substance which is required by a cow several times per day.

A cow will be attracted from grazing area 50 into the attractant station 30 by the water trough 40 or other attractant. It is envisaged that a grazing area could include both lactating and non-lactating cows and that both kinds be attracted into the attractant station. The cow enters the attractant station 30 rather than being herded into the station against its will. Within the drinking area 40, there is room for the cow to move around, drink and interact with other cows. The cow then exits the drinking area 30 of its own free will. As the cow exits the drinking area 30, a control mechanism establishes whether the cow requires milking by testing whether the cow meets a predefined criterion. If the cow meets the predefined criterion, the control mechanism permits entry of the cow into an entry race 70 connecting the attractant station 30 and the milking area 20. The control mechanism 60 and the predefined criterion are further described below.

A cow selected for milking travels down the entry race 70 of its own free will to the milking area 20 where it is milked. As described above, the milking area could include a traditional milking station or could include an AMS.

The system 10 may father include an exit race 80 connecting the milking area 20 and the grazing area 50. The system may further include an alternative exit race 90 connecting the milking area and a grazing area 100 with fresh grass which is different to grazing area 50. The rotating of cows between grazing areas is an important management tool in conventional dairy production systems and could be an important driver to motivate cows to access fresh pasture after transit through the milking area 20.

It is envisaged that the system 10 could include separate exit races 80 and 90 or alternatively could include a single exit race which, in one form, could connect the milking area and the grazing area 50 and in another form could connect the milking area 20 and the grazing area 100. It is envisaged that the control mechanism 60 be configured to select the grazing area 50,100 or some other grazing area which is connected by the exit race 80 or 90 to the milking area 20.

Figure 2:
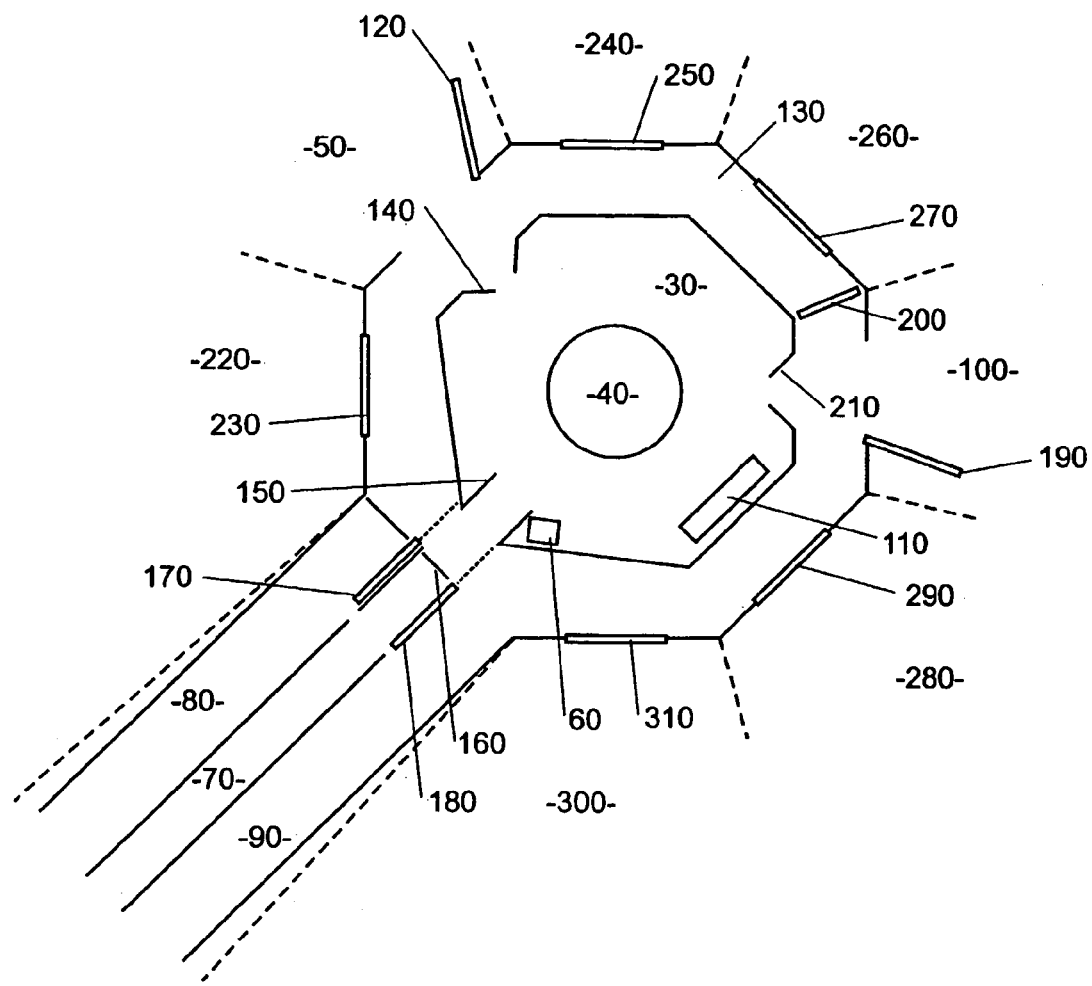
FIG. 2 is an example of a selection system that could be used for an arrangement of grazing areas similar to that as illustrated in FIG. 1.

FIG. 2 shows the attractant station 30 and part of races 70,80 and 90 in more detail.

The attractant station 30 includes a drinking trough 40 and could also include a supplementary station 110 for attractants in the form of supplementary feed such as molasses, a salt lick or a feed concentrate.

A cow enters the attractant station 30 through grazing area gate 120 which is preferably latched open into a peripheral race 130. From the peripheral race, the cow enters the attractant station 30 through a non-return gate 140 permitting one-way travel of the cow from the grazing area 50 to the attractant station 30. Once inside the attractant station 30, the cow may drink from water trough 40 or access supplementary station 110 and interact with other cows. Once the cow is ready to return to the grazing area, the cow travels through a channel 150 past the control mechanism 60.

In one form, each cow could have attached to it a transponder which uniquely identifies each animal. The control mechanism 60 could include one or more sensors configured to transmit signals to a suitable computing device. The connection could include transmission cables or could be wireless connections, for example infrared transmitters and receivers or radio transmitters and receivers. Alternatively, the control mechanism could include a computing device in which signals are stored.

As each cow passes through channel 150, the sensor or sensors of the control mechanism identify the cow from the transponder associated with the cow. The computing device preferably stores data representing cows that have passed through the channel 150 and the timing. The control mechanism is configured to apply one or more predefined criteria on a cow passing through the channel 150.

This predefined criterion could include the time elapsed since the last milking. If a predefined threshold time has been exceeded, the control mechanism determines that the cow is ready to be milked again, but if the predefined threshold time has not yet been reached, the control mechanism determines that the cow is not yet ready to be milked.

Other predefined criteria could include the predicted milk yield or could include the proportion of the herd that has been milked. It is envisaged that the predefined criteria could determine how many cows are currently being milked or on their way to being milked at the milking area 20. If the capacity of the milking area 20 is exceeded, the control mechanism could determine that a particular cow does not require milking at this time.

Alternatively, an individual cow could be identified as a non-lactating cow. In advance, and a list of such cows made available to the control mechanism. A cow included in this list could be denied access to the entry race 70. The predefined criterion could therefore be non-membership of a list of non-lactating cows, or membership of a list of lactating cows.

In one form the system could include an electronic gate 160 between the attractant station 30 and the entry race 70. The system may also include a first drafting gate 170 and a second drafting gate 180.

A cow passing through channel 150 is assessed by the control mechanism to identify whether or not the animal meets a predetermined criterion. The control mechanism is in communication with gates 160,170 and 180. If a cow meets a predefined criterion, the control mechanism 60 opens the electronic gate 160 and closes gates 170 and 180 to permit the animal to enter the entry race 70.

If the animal does not meet a predefined criterion, the control mechanism 60 will close gate 160 and open either gate 170 or gate 180. The control mechanism 60 could be programmed in advance to open gate 170 in preference to gate 180 or vice versa. If gate 170 is opened, the animal will enter the peripheral race 130 and enter grazing area 50 through gate 120.

Alternatively, the control mechanism could be programmed to open gate 180 in preference to gate 170. If gate 180 is opened, the animal will travel into the peripheral race 130 and through grazing area gate 190 into grazing area 100. In this form it is envisaged that a barrier gate 200 prevents the animal from traveling around the peripheral race and into grazing area 50 through grazing area gate 120.

A non-return gate 210 could be positioned near the grazing area gate 190 allowing cows in grazing area 100 to enter the attractant station through non-return gate 210 and to enable cows having passed through drafting gate 180 to re-enter the attractant station 30.

It will be appreciated that this system could be used to rotate cows between different grazing areas. These grazing areas could include, for example, grazing area 220 with grazing area gate 230 opening into the attractant station 30, grazing area 240 with grazing area gate 250, grazing area 260 with grazing area gate 270, grazing area 280 with grazing area gate 290 and grazing area 300 with grazing area gate 310. By opening or closing one or more of the above gates and controlling movement of the cows within the drinking area by one or more barrier gates, the movement of cows between two or more grazing areas can be controlled.

Once a cow has passed through gate 160 to milking area 20, the cow could return along exit race 80 or exit race 90.

In one form the barrier gates and grazing area gates could be set manually on a daily basis or alternatively could be automated.

Cows originally transferred from grazing area 50 to gazing area 100 which re-enter the attractant station 30 return to grazing area 100 through drafting gate 180.

Figure 3:
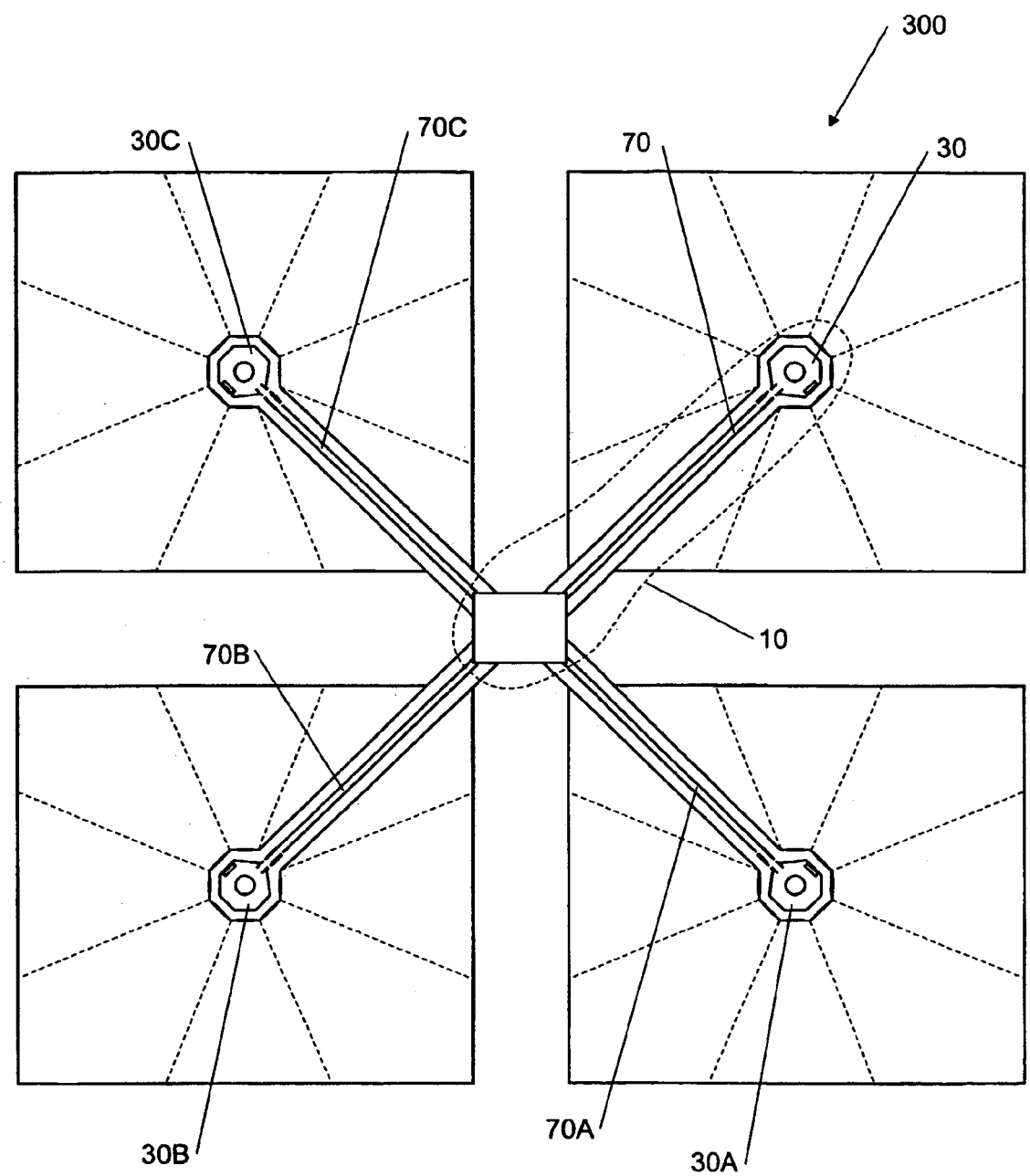
FIG. 3 is an illustration of the present invention in use as a total system.

Referring to FIG. 3, it is envisaged that system 10 form part of a larger selection system 300. A single milking area 20 could be connected to attractant station 30 via race 70. The milking area 20 could additionally be connected to attractant stations 30A, 30B and 30C via races 70A, 70B and 70C respectively.

Figure 4:
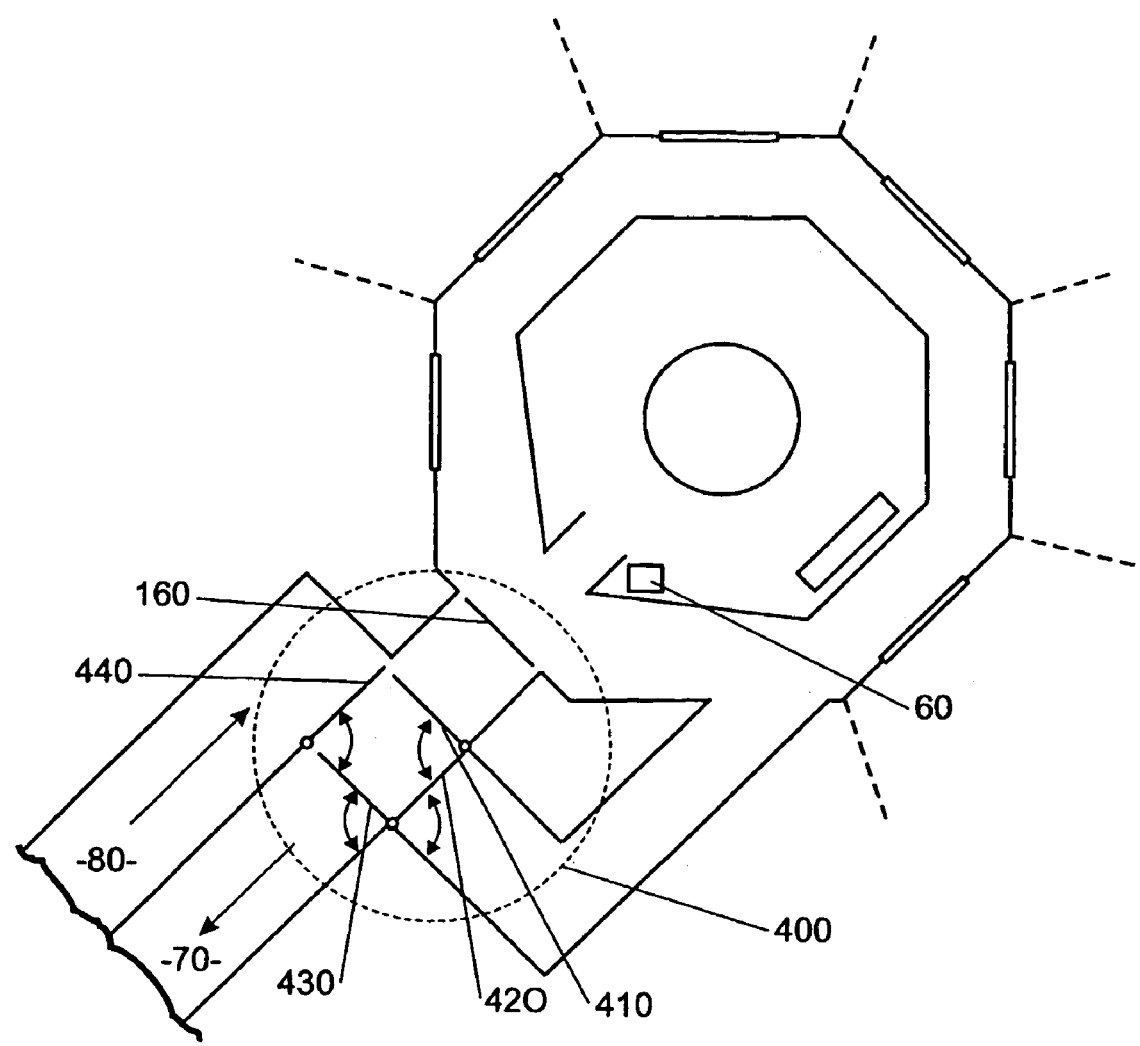
FIG. 4 shows a system of enabling exit cow traffic to cross incoming cow traffic.

FIG. 4 illustrates a preferred form arrangement of gates to enabling exit cow traffic to cross incoming cow traffic. The arrangement is indicated generally at 400. The system enables cross-over between cows travelling along entry race 70 with cows travelling along exit race 80. The system is preferably implemented as a series of non-return gates, for example gates 410, 420,430 and 440.

In use, a cow ready to be milked passes through gate 160 and passes through non-return gate 410. Gate 410 is urged towards gate 420 preventing the cow from travelling through gate 420. The cow cannot travel through gate 440 and so travels through gate 430 toward the milking area.

Cows after milking travel along exit race 80 and through gate 440. Gate 440 is urged toward gate 430 and prevents the cow from passing through gate 430. The cow cannot pass through gate 410 and so passes through game 420 and then out toward the drinking area and/or grazing areas.

It is envisaged that this arrangement of gates could be positioned near the attractant station or alternatively near the milking area.

The foregoing describes the invention including preferred forms thereof. Alterations and modifications as will be obvious to those skilled in the art are intended to be incorporated within the scope hereof, as defined by the accompanying claims.

The invention claimed is:

1. A selection system for animals comprising:
   a milking area arranged to enable milking of one or more lactating animals;
   an attractant station located in a grazing area in a position external to, and remote from the milking area, said attractant station including an attractant configured to attract an animal from the grazing area;
   an entry race connecting the attractant station and the milking area; and
   a control mechanism configured to permit entry of a lactating animal meeting a predefined criterion into the entry race from the attractant station.

2. A selection system as claimed in claim 1, further comprising an exit race connecting the milking area and the grazing area.

3. A selection system as claimed in claim 1, further comprising a non-return gate between the grazing area and the attractant station to permit one-way travel of an animal from the grazing area to the attractant station.

4. A selection system as claimed in claim 1, further comprising an electronic gate between the attractant station and the entry race wherein the control mechanism is in communication with the electronic gate to open and close the gate.

5. A selection system as claimed in claim 1, wherein the attractant is configured to attract an animal from a first grazing area, the system further comprising an exit connecting the milking area and a second grazing area.

6. A selection system as claimed in claim 5 further comprising:
   a first drafting gate between the attractant station and the first grazing area; and
   a second drafting gate between the attractant station and the second grazing area, wherein the control mechanism is in communication with the first drafting gate and the second drafting gate to select the grazing area connected by the exit race to the milking area.

7. A selection system as claimed in claim 1, wherein the attractant is configured to attract an animal from a first grazing area, the system further comprising an exit race connecting the milking area and the first grazing area.

8. A selection system as claimed in claim 1, wherein the attractant station is positioned at least 50 meters from the milking area.

9. A selection system as claimed in claim 1, wherein the attractant station is positioned between 250 meters and 450 meters from the milking area.

10. A selection system as claimed in claim 1, wherein the attractant is capable of enticing an animal less than or equal to twice daily.

11. A selection system as claimed in claim 1, wherein the attractant includes a drinking trough.

12. A selection system as claimed in claim 1, wherein the attractant includes molasses.

13. A selection system as claimed in claim 1, wherein the attractant includes a salt lick.

14. A selection system as claimed in claim 1, wherein the attractant includes a feed concentrate.

15. A selection system as claimed in claim 1, wherein the predefined criterion includes time elapsed since last milking.

16. A selection system as claimed in claim 1, wherein the predefined criterion includes predicted milk yield.

17. A selection system as claimed in claim 1, wherein the predefined criterion includes the proportion of lactating animals that have been milked.

18. A method of selecting animals for milking in a milking area comprising:
   attracting an animal from a grazing area into a drinking station located in the grazing area in a position external to, and remote from the milking area, an entry race connecting the drinking station and the milking area;
   determining whether an animal in the attractant station meets a predefined criterion; and
   permitting entry of the animal meeting the predefined criterion into the entry race.

19. A method as claimed in claim 18, further comprising the step of permitting travel of the animal meeting a predefined criterion from the milking area to the grazing area.

20. A method as claimed in claim 18, further comprising the step of permitting one-way travel of an animal from the grazing area to the drinking station.

21. A method as claimed in claim 18, further comprising the step of controlling entry of the animal into the entry race with an electronic gate.

22. A method as claimed in claim 18, further comprising the steps of attracting an animal from a first grazing area into the attractant station and permitting travel of the animal meeting a predefined criteria from the milking area to a second grazing area.

* * * * *